June 8, 1965
T. L. THORSEN ETAL
3,188,460
ADJUSTABLE LAMP
Filed Dec. 6, 1962
3 Sheets-Sheet 1
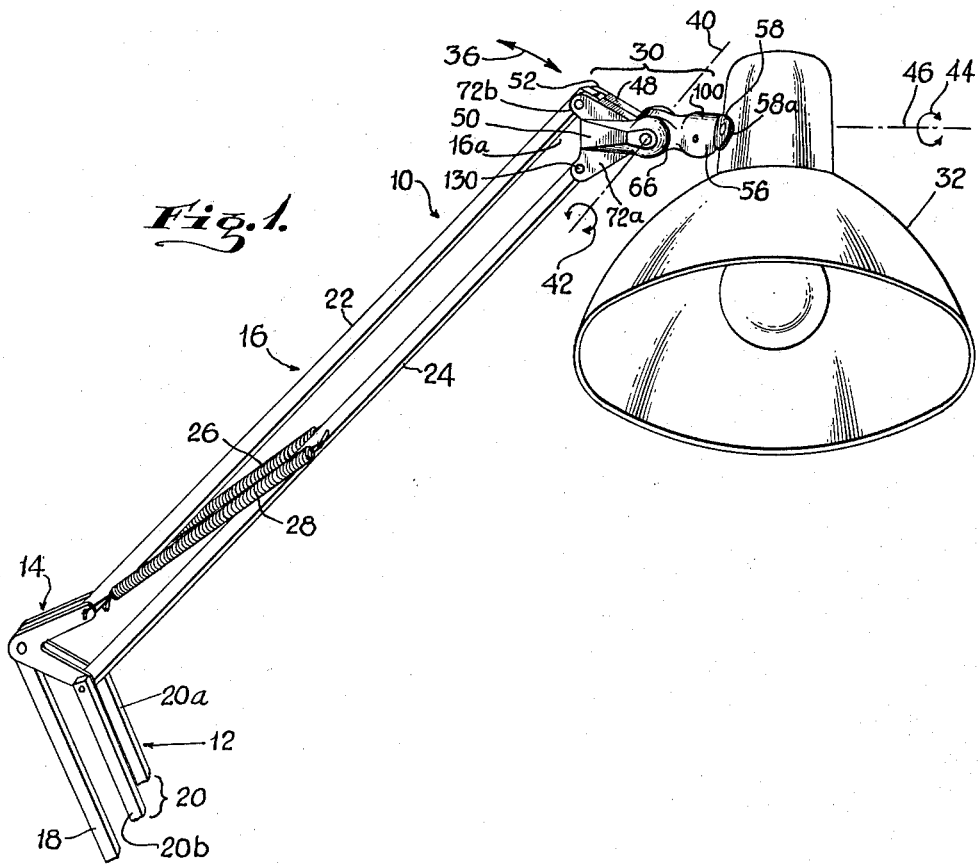
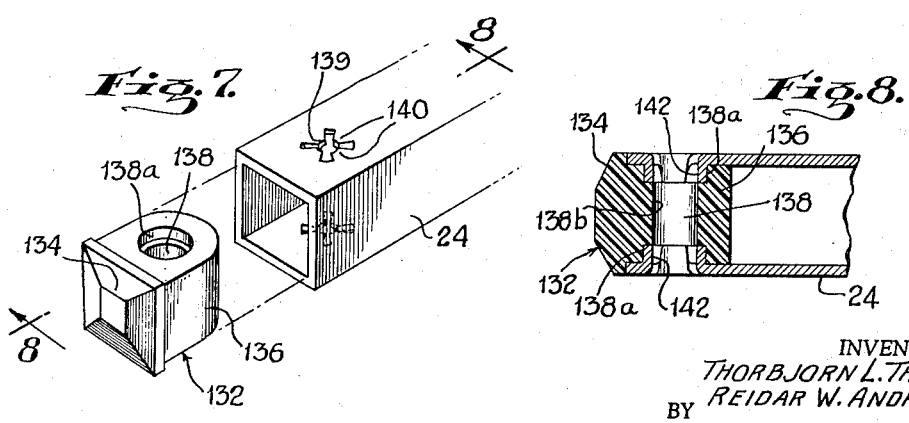
INVENTORS
THORBJORN L. THORSEN
REIDAR W. ANDRESEN
BY
Blair & Buckles
ATTORNEYS

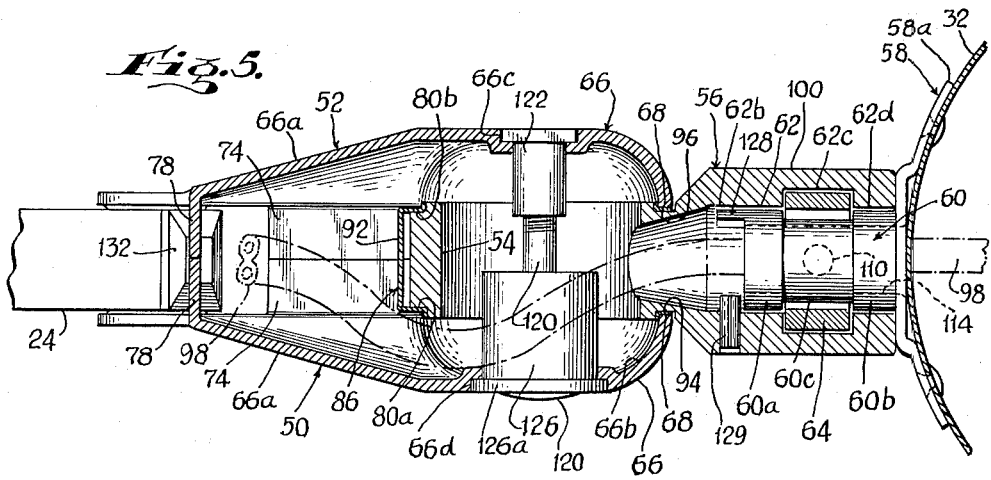

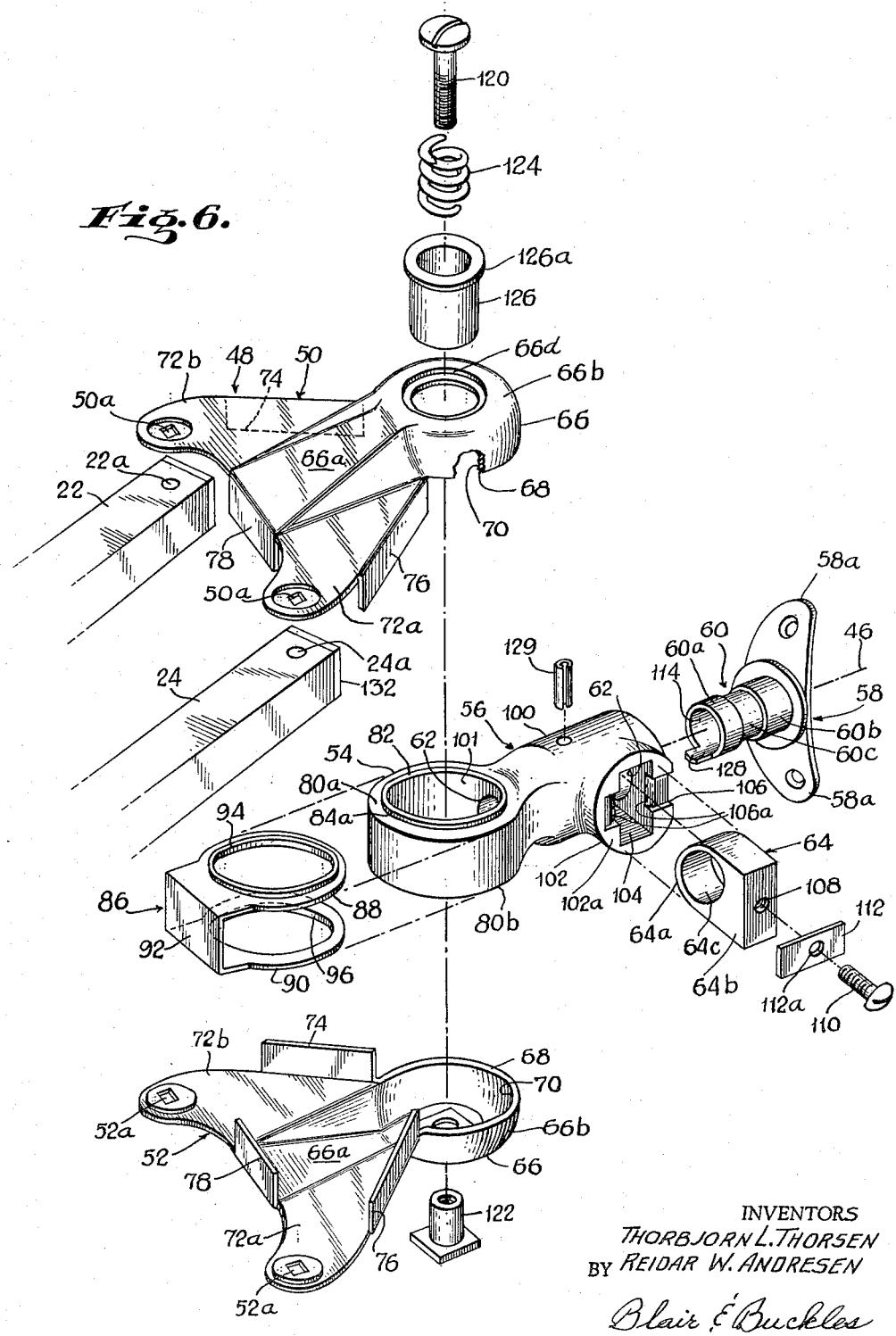

United States Patent Office 3,188,460
Patented June 8, 1965

3,188,460
ADJUSTABLE LAMP
Thorbjorn L. Thorsen, Armonk, N.Y., and Reidar Wilhelm Andresen, Lambertseter, Oslo, Norway, assignors to Tobey Manufacturing Corporation, Armonk, N.Y.
Filed Dec. 6, 1962, Ser. No. 242,819
6 Claims. (Cl. 240—52)

This invention relates to a static universal-type coupling for supporting a movable device in any adjusted orientation, specifically in any adjusted orientation about two perpendicular axes, and to an adjustable lamp incorporating the coupling.

The invention also provides a novel, attractive construction for the arms of an equipoised lamp to minimize wear between the arms and the pins that hinge them to the lamp structure.

The coupling comprises three successive members, termed a bracket, a stem and a fitting, pivotally joined so that the stem is rotatable in one direction with respect to the bracket and the fitting is rotatable in another direction about the stem. The coupling is constructed to apply adjustable friction between the coupled members with a resilient pressure, thereby achieving accurate adjustment of the friction with minimum effort. This is required to balance the conflicting requirements of high friction for firmly holding the coupled members in a desired rotational orientation and low friction for facile orientation adjustment.

The coupling is particularly suited for use in lamp structures of the type generally known as equipoised lamps and disclosed in U.S. Patent No. 2,090,439. In these lamps, the coupling joins the socket and shade assembly to the parallel arms that carry the assembly. With prior couplings, excessive force is often required to adjust the orientation of the shade. On other occasions, the prior art couplings become loose and the shade does not retain the orientation in which it is placed. In addition, the wires leading to the socket from the supporting arms are exposed at the junction between the arms and the shade, presenting a safety hazard as well as unsightly appearance.

Accordingly, it is an object of the present invention to provide an improved coupling for supporting a movable device in a desired orientation, and particularly in any desired orientation adjusted about two perpendicular axes.

Another object of the invention is to provide a universal-type coupling having independently adjustable friction in each joint. A corollary object is that the friction be readily adjusted to a precise value.

A further object of the invention is to provide a coupling of the above character in which the coupled members are positively locked together and are held in any desired adjustable orientation by an independently adjustable force.

Another object of the invention is to provide an improved coupling of the above character for use in adjustable lamps. More specifically, it is an object of the invention to provide a coupling of the above character for joining a socket and shade assembly with the support arms of an equipoised lamp.

A further object is to provide a coupling to support the shade and socket of an adjustable lamp and that furnishes a safe and decorative conduit for the electrical conductors leading to the socket.

A further object of the invention is to provide an efficient construction for the arms of an equipoised lamp to overcome wear between the arms and the pins that hinge them to the lamp structure.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 1 is a fragmentary perspective view of an equipoised lamp embodying the present invention;

FIGURE 2 is a side cross-sectional view of the coupling in the lamp of FIGURE 1;

FIGURE 3 is a transverse cross-sectional view of the coupling in the lamp of FIGURE 1 taken along the line 3—3 of FIGURE 2;

FIGURE 4 is a transverse cross-sectional view of the coupling in the lamp of FIGURE 1 taken along the line 4—4 of FIGURE 2;

FIGURE 5 is a cross-sectional view of the coupling in the lamp of FIGURE 1 taken along line 5—5 of FIGURE 2;

FIGURE 6 is an exploded view of the coupling in the lamp of FIGURE 1;

FIGURE 7 is a fragmentary exploded view of novel construction, embodying features of the present invention, for the lever arms of an equipoised lamp; and FIGURE 8 is a side cross-sectional view of the assembled arm construction shown in FIGURE 7 taken along line 8—8 of FIGURE 7.

Turning now to FIGURE 1, in the illustrated embodiment of the invention, an equipoised lamp indicated generally at 10 is constructed with a lower lever assembly indicated generally at 12 rotatably connected at its upper end to a link member 14. An upper lever assembly indicated generally at 16 is rotatably connected at its lower end to the member 14.

The lower lever assembly 12 is constructed with two parallel arms 18 and 20; the arm 20 comprising a pair of parallel bars 20a and 20b. The upper lever assembly 16 also has a pair of parallel arms 22 and 24 spaced apart transverse to the axis about which the lever assembly 16 rotates. A pair of cylindrical coil springs 26 and 28 are tensioned between the link member 14 and an intermediate portion of the arm 24 to provide a balanced equipoised structure. The conventional details and operation of the equipoised lamp 10 are well known to those skilled in the art, being disclosed in U.S. Patent No. 2,090,439.

The lamp 10 of FIGURE 1 has also a universal-type coupling indicated generally at 30 supporting a shade and socket assembly 32 and joining it to the lever assembly 16. Rotation of the upper lever assembly 16 about the link member 14 moves the assembly's upper end 16a in the direction indicated with arrow 36 carrying the shade and socket assembly 32 with it.

The coupling 30, detailed below, allows the assembled shade and socket to rotate about an axis 40 in the direction indicated by arrow 42 and also to rotate in the direction indicated by arrow 44 about an axis 46, perpendicular to the axis 40, enabling the user to adjust the lamp 10 to direct its illumination in any direction. The coupling both firmly maintains the shade and socket assembly 32 in the desired orientation and allows the orientation to be changed with minimum force.

Turning now to the exploded view of the coupling 30 in FIGURE 6, a bracket indicated generally at 48 and constructed with two plates 50 and 52 is hinged to the arms 22 and 24 by screws (not shown) or the like successively passing through bracket plate holes 50a, arm holes 22a or 24a and bracket plate holes 52a. The plates 50 and 52 form, in effect, a socket that clamps a cylindrical bulb 54 of a stem indicated generally at 56, thereby firmly supporting the stem 56 while allowing it to rotate about the axis 40. FIGURE 1 shows the plates assembled to form the bracket 48, with the stem 56 supported by the bracket.

As shown in FIGURE 1, the socket and shade assembly 32 is connected to the coupling 30 with a fitting indicated generally at 58 that is rotatably joined to the stem 56. As best seen in FIGURE 6, the fitting 58 has a shaft indicated generally at 60 that is retained in a bore 62 in the stem 56 by a clamp block 64 in the manner detailed hereinafter. The block 64 in stem 56 positively locks the fitting 58 in the bore 62, but allows the fitting to rotate about the axis 46. Flange tabs 58a are provided on the fitting to securely support the shade and socket assembly.

In the connection between the stem 56 and bracket 48, bearing surfaces between these elements are urged together to develop a "braking" friction force tending to maintain fixed the orientation of the stem 56 about the axis 40. However, the braking force is adjustable to allow the stem's orientation to be changed with minimum force and still maintain sufficient "braking" to hold the stem in a desired orientation. The connection between the stem 56 and the fitting 58 is constructed to provide a similar braking force.

In prior couplings, the adjustment of the braking forces was extremely critical, making it exceedingly difficult to obtain a balance between easy orientation adjustment and firm maintenance of the desired orientation. Moreover, a single adjustment was generally used in prior couplings to control the braking forces in two rotating connections, thereby making it even more difficult to "balance" the operation of each connection.

In the present coupling, the braking force between the bracket 48 and the stem 56 is sensitively and adjustably independent of the braking force between the stem 56 and the fitting 58. Moreover, it has been found that easy orientation adjustment and stable maintenance of a desired orientation can both readily be achieved when the braking force is applied by adjustable resilient means, such as a compressible coil spring or a flexible leaf spring. The efficient construction of the present coupling, achieving these important advantages, will now be described in detail.

As best seen in FIGURE 6, each of the bracket plates 50 and 52 has a concave hollow body 66 formed with a wedge portion 66a and a bowl-shaped socket portion 66b. The base of each socket portion 66b has an annular bearing surface 68 and a cylindrical retaining surface 70 adjacent to the inner edge of the bearing surface 68.

The plates 50 and 52 have also wings 72a and 72b extending from each side of the wedge portion 66a. A bracket wall 74 extends transversely from the wing 72b, away from the recess of the hollow body 66, similar wall 76 extends from the wing 72a, and a wall 78 extends in the same direction from the base of the wedge portion 66a.

As best seen in FIGURES 1 and 5, when the bracket 48 is assembled, the walls 74, 76 and 78 of one plate extend toward the respective walls of the other plate to partly enclose the bracket, excluding dirt and enhancing the lamp's appearance. In addition, when the bracket is assembled, the annular bearing surfaces 68 of each plate 50 and 52 are spaced apart parallel to each other and concentric with the axis 40.

In the illustrated embodiment of the invention, as seen in FIGURES 3 and 6, the bulb 54 of stem 56 is formed as a hollow right circular cylinder with annular bearing surfaces 80a and 80b at each end and with a rim 82 axially extending from each surface 80a and 80b to provide cylindrical retaining surfaces 84a and 84b.

As shown in FIGURES 3, 5 and 6, the joint between the stem 56 and the bracket 48, for supporting the stem 56 and allowing it to rotate about the axis 40, is formed by sandwiching the cylindrical bulb 54 between the socket portions 66b of the plates 50 and 52, with an optional shield indicated generally at 86 fitted between the plates and the bulb. Omitting the shield 86, which is discussed hereafter, the surfaces 68 and 70 of plate 50 lie against the bulb surfaces 80a and 84a respectively. The annular and cylindrical surfaces 68 and 70 of plate 52 similarly mate with the bulb's respective annular and cylindrical surfaces 80b and 84b.

The plates 50 and 52 are clamped together about the bulb 54 with a machine screw 120 threadably retained in a nut 122 having a square flange that is seated in a mating recess 66c in the body of the plate 52, as best seen in FIGURES 3, 5 and 6. A helical spring 124 is compressed between the head of screw 120 and the bottom of a cup 126 whose flanged rim 126a seats in an annular recess 66d in the plate 50. The body portion of the cup 126 protrudes through the plate 50 into the interior of the bracket 48, as best seen in FIGURES 3 and 5 and the screw 120 passes through the bottom of the cup.

With this construction, the compressed spring 124 resiliently urges the plates 50 and 52 together to clamp the bulb 54. Threading screw 120 further in or out of nut 122 changes the compression of spring 124 and thereby provides a ready adjustment for the clamping force. Further advantages of the bracket-stem joint are its compact and efficient construction and the substantially uniform distribution of the clamping force over annular bearing surfaces 80a and 80b of the bulb.

The abrasion shield 86, FIGURE 6, for protecting electrical wires that pass within the coupling 30 from abrasion when the stem 56 rotates about the axis 40, is preferably assembled over the bulb 54 prior to securing it within the bracket 48. The shield 86 is constructed with two annular rims 88 and 90 maintained spaced apart parallel and in register by a base 92. In addition, cylindrical rims 94 and 96 extend away from each other at the inner edges of the annular rims 88 and 90, as illustrated.

As shown in FIGURES 3 and 5, in the assembled coupling 30, the shield annular rims 94 and 96 lie between the bearing surfaces 68 and 80a and 80b. The cylindrical rims 94 and 96 of the shield fit between the cylindrical surfaces 70 and 84a and 84b. As best seen in FIGURE 2, the base 92 of the shield 86 is seated within the wedge portions 66a of the assembled plates 50 and 52 to prevent the shield 86 from rotating when the stem 56 is rotated about the axis 40 (FIGURES 1 and 6).

As seen in FIGURES 2 and 5, the electrical wires indicated at 98 enter the bracket 48 from within the arm 22 and pass within the wedge portion 66a of plate 52 to that plate's socket portion 66b before passing into the cylindrical bulb 56 and the bore 62 of stem 56. In the absence of the abrasion shield 86, the wires 98 would be free to bear against the surfaces 80b and 84b of the bulb 56, being abraded whenever the stem is rotated within the bracket 48, and pinched between bulb 56 and wings 72a or 72b or walls 74 or 76. The shield 86, prevented from rotating with the stem, effectively prevents this abrasion or pinching.

Turning now to the connection between the stem 56 and the fitting 58, the stem has a tube 100 extending from the side of the cylindrical bulb 54, as shown in FIGURE 6. The bore 62 extends through the tube 100, communicating with and opening into the cylindrical hollow 101 in the bulb 54 to accommodate and enclose the wires 98 shown in FIGURES 2 and 5.

As also shown in FIGURES 2 and 5, the bore 62 has a frusto-conical section 62a adjacent its entry into the bulb hollow, followed in succession by a cylindrical inner portion 62b, an intermediate portion 62c and a portal portion 62d. The diameters of the inner and portal portions are preferably the same and slightly larger than the diameter of the intermediate portion.

The tube 100 has a lateral boss 102 (FIGURE 6) through which an aperture 104 extends to intersect the bore 62 at its recessed intermediate portion 62c as shown in FIGURES 2, 4 and 5. A recess 106 of rectangular cross-section is formed in the face 102a of boss 102 intersecting two sides of the aperture 104. As best seen in FIGURES 2 and 6, the recess 106 is tapered inward at 106a, with increasing depth adjacent its intersections with the aperture 104.

The clamp block 64, FIGURE 6, has a semi-cylindrical portion 64a and a rectangular portion 64b enclosing a cylindrical bore 64c that preferably has the same diameter as the cylindrical portal and inner portions 62b and 62d to receive the shaft 60 of fitting 58. The block 64, the aperture 104, and recessed bore portion 62d in the stem 56 are dimensioned to allow the block to fit in the aperture 104 with its bore 64c concentric with the bore 62. In addition, the semi-cylindrical portion 64a of the clamp block preferably extends along the entire axial length of the intermediate bore portion 62c.

The face, remote from the bore 64c, of the clamp block rectangular portion 64b is machined with a tapped hole 108 to receive a machine screw 110. A spring plate 112, FIGURE 6, having a clearance hole 112a for the machine screw 110, is dimensioned to lie in the recess 105 in the clamp block, spanning the aperture 104. The spring plate 112 is normally biased, by means of the screw 110, to urge the block 64 out of the bore 62, thereby locking the shaft 60 of fitting 58 to the stem 56, as detailed hereinafter.

The fitting 58, shown in FIGURE 6, has a passage 114 through the shaft 60 for receiving the wires 98 that lead to the lamp socket, as shown in FIGURES 2 and 5. The outer surface of the shaft 60 is formed with two cylindrical shoulder portions 60a and 60b of the same diameter axially spaced by a recessed cylindrical portion 60c.

To assemble the stem 56-fitting 58 joint, the block 64 is placed in the aperture 104 and the fitting shaft 60 is inserted in the stem bore 62, passing through the block bore 64c, as seen in FIGURES 2 and 5. Thereafter, the spring plate 112 is fitted within the recess 106 and screw 110 is threaded into the hole 108 to draw the block 64 toward the spring plate 112. This engages the semi-cylindrical portion 64a of the clamp block between the cylindrical shoulder portions 60a and 60b of the fitting 58, as seen in FIGURES 2 and 4. When the semi-cylindrical portion 64a of the block 64 becomes seated against the recessed portion 60c of the fitting 58, further take-up with the screw 110 resiliently deflects the spring plate 112 into the tapers 106a of the recess 106 and into the aperture 104, as best seen in FIGURES 2 and 4.

The fitting 58 is thus securely anchored in the stem 56 by the block 64, while remaining free to rotate about the axis 46, FIGURE 6. The resilient deflection of the spring plate 112 maintains the block 64 in frictional engagement with the shaft 60 to maintain the fitting 58, connected to the shade and socket assembly 32, FIGURE 1, in the desired orientation about the axis 46. Threading the screw 110 further in or out of the block 64 gradually changes the pressure between the block 64 and the fitting shaft 60 to clamp the fitting shaft tight enough to prevent the fitting from slipping from the desired orientation while still allowing the fitting to be rotated with minimum effort when desired. It will thus be seen that the stem 56-fitting 58 joint is adjustable independent of the bracket 48-stem 56 joint.

The coupling 30 is preferably constructed as shown in FIGURE 6 with a finger 128 on the fitting 58 and a stop member 129 protruding into the bore of stem 56. As seen in FIGURE 2, the stop member will engage the finger 128 to prevent the fitting from rotating more than a full turn (360°) about the axis 46. This prevents the wires 98 from being tightly twisted.

Turning to the construction of the lever assemblies 12 and 16, FIGURE 1, each arm in the assemblies transmits a considerable axial force to its hinged joint. For example, the arm 24 is compressed by the weight of the coupling 30 and the shade and socket assembly 32 so that it transmits an upward axial force to the hinge pin 130 that joins the arm to the bracket 48. The arms are generally made of hollow tubing, which is light weight and provides a conduit for the wires leading to the socket.

With prior constructions, continual movement of the lever assembly 16 back and forth in the direction of the arrow 36 causes the hinge joint between the arm 24, for example, and the pin 130 to wear. The wearing eventually causes the hinge joint to become inoperative. The construction embodying other features of the invention now described with reference to FIGURES 7 and 8 efficiently overcomes this disadvantage while at the same time providing an attractive dust-proof seal for the hollow bars that constitute the lever assemblies.

A plug indicated generally at 132 having a decorative flanged head 134 is fitted with its body 136 extending into the end of the bar 24 and its head 134 covering the unsightly open end of the bar. A hole 138, formed through the plug body prior to the assembly, has enlarged cylindrical portions 138a at each end. After the plug is fitted in the bar 24, with its body 136 preferably forming a press fit within the hollow bar, a small hole 139, FIGURE 7, is punched through the opposing walls of the bar 24 concentric with the hole 138 in the plug 132. Thereafter, the rim 140, FIGURE 7, of material around the hole 139 is cold formed or swaged into the recessed portions 138a of the plug hole to form cylindrical hubs 142, shown in FIGURE 8. The hubs 142 and the cylindrical surface 138b forming the center of hole 138 thus form a smooth, continuous bore through the bar 24.

The cylindrical hubs 142 provide a large bearing surface for engagement with the pin 130, practically eliminating frictional wearing of the pin and of the arm to insure that they last practically indefinitely. The hubs 142 further serve to lock the plug 132 in the arm 24, providing a permanent seal. A further advantage of this construction is that the plastic material of the plug 132 forming the central portion of the hole 138 provides a smooth bearing surface for the pin 130, further reducing frictional wear. It should be noted that the plug 132 adds practically negligible cost to the lamp and is secured thereto by conventional tools such as a punch press in the same operation as presently required to form the holes in the arm 24 for the pin 130.

In summary, there is described above a novel universal-type coupling for supporting a movable device, such as the socket and shade assembly of a lamp, in any desired adjustable orientation. The coupling members are positively locked together, while being free to rotate with respect to each other.

Each coupling member is held in a desired rotation orientation, supporting the movable device, by a bearing surface resiliently urged against the member to impede its rotation. The magnitude of the braking force between the bearing surface and the member is readily adjusted to a precise value by adjusting the deflection of a spring or similar resilient element that applies the force. With this construction, a braking force large enough to hold the coupling members firmly in a desired orientation and yet small enough to allow the orientation to be adjusted with minimum effort is readily achieved.

Furthermore, the adjustable devices of this invention incorporate a novel construction for the structural tubular support arms. According to this construction, a plastic plug is locked in the end of the arm, attractively sealing the unsightly open end and providing a large bearing surface for hinging the arm to the lamp structure.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described the invention, what is claimed as new and secured by Letters Patent is:

1. A coupling for supporting a device in any rotation orientation about two axes, said coupling comprising in combination
    (A) a fitting connected to said device,
        (1) a shaft on said fitting extending concentric with a first axis about which said device is rotatable,
            (a) said shaft having shoulder portions axially spaced apart about an intermediate portion whose diameter is less than the diameter of said shoulder portions,
    (B) a stem for rotatably supporting said fitting,
        (1) means forming a bore through said stem around said shaft,
        (2) means forming a cavity extending transversely into said bore, and
        (3) a bulb portion on said stem formed with parallel annular bearing surfaces and cylindrical surfaces,
            (a) said cylindrical surfaces being concentric with a second axis about which said device is rotatable,
    (C) a block having an aperture for receiving said shaft of said fitting,
        (1) said block being inserted into said stem cavity to align said block aperture in said stem bore
            (a) to initially allow said shaft of said fitting to pass through said block aperture in said bore, and
        (2) a first aperture surface engaging the side of said intermediate shaft portion to lock said fitting in said stem when said block is displaced transverse to said bore,
    (D) means on said block resiliently urging said block transverse to said bore
        (1) to positively hold the shaft of said fitting in said stem bore and
        (2) urge said block against said shaft to impede the rotation of said fitting, and
    (E) a bracket connected to said bulb and
        (1) having braking surfaces engaging said bulb bearing surfaces and retaining surfaces engaging said bulb cylindrical surfaces to support said stem and allow it to rotate about said second axis with respect to said bracket.

2. The combination defined in claim 1 in which said resiliently urging means on said block comprises
    (A) screw means threadably engaging said block and
    (B) spring means resiliently urging said screw means transversely away from said bore in said stem
        (1) to resiliently urge said block transverse to said bore.

3. In an adjustable lamp structure having a support and a lamp socket assembly, a coupling joining said support and said socket assembly for attitude orientation of said socket assembly about two axes, comprising in combination:
    (A) a fitting connected to said socket assembly,
        (1) having a shaft portion extending concentrically with a first axis about which said fitting is rotatable,
            (a) means forming a reduced portion on said shaft portion;
    (B) a stem for rotatably supporting said fitting shaft, including
        (1) means forming a bore through said stem around said shaft,
        (2) means forming an opening into and transverse of said bore, and
        (3) a cylindrical bulb portion on said stem having annular braking surfaces thereon about a second axis of rotation;
    (C) a frictional bearing member in said transverse opening having
        (1) a surface engaging said reduced portion of said fitting shaft; and
    (D) a bracket connected to said cylindrical bulb portion,
        (1) and slidably engaging said annular braking surfaces thereof.

4. The coupling defined in claim 3 wherein said frictional bearing means comprises:
    (C) (2) a block in said transverse opening having
            (a) means forming an opening through one end,
            (b) said block opening being positioned around said reduced shaft portion,
        (3) a spring bearing against the other end of said block and said stem to urge a portion of the surface of said block opening into frictional engagement with said reduced shaft portion.

5. The coupling defined in claim 3 wherein said bracket is provided with spring means for urging said bracket into frictional, sliding engagement with said annular braking surfaces.

6. In an adjustable lamp having a tubular support member which is rotatably connected to another part of said lamp, the combination of:
    (A) a plug of low friction material inserted into an end of said tubular support,
        (1) said plug having means forming a stepped bore therethrough,
            (a) the axis of said bore being transverse to the longitudinal axis of said tubular support;
    (B) means forming two openings in said tubular support,
        (1) said openings being aligned with said bore of said plug, and
        (2) a hub around each of said openings,
            (a) said hubs projecting inwardly into and engaging said stepped bore to secure said plug into the end of said tubular support and to permit a pin to be positioned in said stepped bore through said openings.

References Cited by the Examiner
UNITED STATES PATENTS

| | | | |
|---|---|---|---|
| 1,119,618 | 12/14 | Lumley | 240—73 |
| 2,090,439 | 8/37 | Carwardine | 248—160 |
| 2,178,751 | 11/39 | Glasgow | 248—289 |
| 2,395,178 | 2/46 | Fiori | 240—73 |
| 2,682,609 | 6/54 | Wampler | 248—289 |

FOREIGN PATENTS 152,077  10/55  Sweden.

NORTON ANSHER, *Primary Examiner.*